United States Patent [19]
Fein et al.

[11] Patent Number: 5,897,623
[45] Date of Patent: Apr. 27, 1999

[54] INTERFACE METHOD FOR PROVIDING INFORMATION ABOUT ITEMS ON A LIST FOR INTERACTIVE TELEVISION

[75] Inventors: Robert M. Fein, Portland, Oreg.; Erik G. Urdang, Boulder, Colo.

[73] Assignees: U S WEST, Inc., Denver; MediaOne Group, Inc., Englewood, both of Colo.

[21] Appl. No.: 08/706,046

[22] Filed: Aug. 30, 1996

[51] Int. Cl.[6] .................................................. H04N 7/173
[52] U.S. Cl. ............................ 705/27; 705/14; 705/15; 705/16; 705/26; 705/28; 395/227; 395/560; 348/13; 348/565
[58] Field of Search .................................... 395/227, 560; 705/14, 15, 16, 26, 27, 28; 348/565, 13; 345/352, 353, 354

[56] References Cited

U.S. PATENT DOCUMENTS

| | | | |
|---|---|---|---|
| 5,053,956 | 10/1991 | Donald et al. | 395/560 |
| 5,235,509 | 8/1993 | Mueller et al. | 705/15 |
| 5,262,940 | 11/1993 | Sussman | 705/28 |
| 5,353,219 | 10/1994 | Mueller et al. | 705/16 |
| 5,528,304 | 6/1996 | Cherrick et al. | 348/565 |
| 5,654,748 | 8/1997 | Matthews, III | 348/13 |
| 5,664,110 | 9/1997 | Green et al. | 705/26 |
| 5,699,526 | 12/1997 | Siefert | 705/27 |
| 5,710,886 | 1/1998 | Christensen et al. | 705/14 |
| 5,721,832 | 2/1998 | Westrope et al. | 395/227 |

*Primary Examiner*—Allen R. MacDonald
*Assistant Examiner*—Jagdish Patel
*Attorney, Agent, or Firm*—Holme, Roberts & Owen, LLP

[57] ABSTRACT

An interface system and method for providing information concerning items available via an interactive system and service is disclosed. In one embodiment of the method of the present invention, the method includes the steps of displaying at least a first menu item to the viewer or user via a screen associated with the interactive system, the first menu item denoting a first item, processing at least a first input from the viewer regarding obtaining information related to the first item and displaying serially to the viewer a plurality of images related to the first item.

25 Claims, 11 Drawing Sheets

INTERFACE METHOD FOR PROVIDING INFORMATION ABOUT ITEMS ON A LIST FOR INTERACTIVE TELEVISION

FIELD OF THE INVENTION

The present invention generally relates to an interface system and method for providing information over interactive systems, and in particular, to a system and method for providing information to users of interactive television systems.

BACKGROUND OF THE INVENTION

Over the years, many systems and techniques have been developed for purposes of facilitating the advertising, marketing and selling of various products and services. Such systems and techniques generally provide a means by which advertisers can present information concerning the merits of the product or service in an attempt to convince members of the public that the advertised product or service should receive due consideration in their future purchasing decisions. For instance, advertisements for products in print media (e.g., newspapers, direct mail) generally include text describing the product and one or more still photos of the product. Such print media advertisements can provide the reader with a great deal information concerning the advertised product, such as how the product appears, cost of the product, materials/ingredients used to make the product, weight, and/or where the product was made. As such, the reader of print media advertisements can formulate an informed opinion or impression of the advertised product. Advertisements presented to the public over other types of media, such as television, are also capable of providing the viewer with both visual and auditory information concerning the product or service. For example, for purposes of presenting information to the viewer concerning the product or service on broadcast or cable television, such that the viewer may make an informed purchasing decision, a television commercial typically includes hundreds or thousands of frames of video and a soundtrack, both of which cooperate to trumpet the qualities of the product or service being advertised. However, costs associated with making such broadcast and cable television commercials can be high, based upon costs for materials (e.g., film, set) and labor (e.g., for actors/actresses, camera men and writers), as well as costs for air time for broadcasting such commercials on television.

SUMMARY OF THE INVENTION

Accordingly, it is an object of the present invention to provide a system and method for providing product and/or service information to users of interactive systems.

It is another object of the present invention to provide an easy to use and efficient system and method for providing information to viewers of interactive systems.

In one aspect of the present invention, a method for providing information in the form of displayable images to the viewer or user of an interactive system is disclosed. In one embodiment, the method includes the steps of displaying at least a first menu item representing a first item (e.g., a first product or service) to the viewer via a screen, processing at least a first input from the viewer regarding obtaining or receiving information related to the first item, the first input being associated with the first menu item, and displaying serially at least a plurality of images related to the first item via the screen. In an alternative embodiment, the first menu item corresponds to a group or category of products or services purchasable or orderable by the viewer, rather than a single product or service. As such, the method of the present invention assists the viewer in making an informed buying decision by providing the viewer of an interactive system with both textual and graphic information regarding the items purchasable or orderable via the interactive system and service.

In one embodiment, the method of the present invention includes the steps of displaying at least a first menu having a plurality of menu items corresponding to items receivable or orderable by the viewer, receiving at least a first input regarding one of obtaining information for at least a first of the plurality of items and ordering one of the plurality of items, processing the first input and performing one of displaying information concerning the first item and delivering the first item to the viewer, depending upon the first input. In instances where the viewer has selected the first item for purposes of obtaining more information regarding the first item, the step of displaying information concerning the first item includes displaying at least one of a first image related to the first item and a first set of information indicators related to the first item. Such a first image related to the first item generally provides the viewer with a graphic representation of the first item or an image related thereto. For example, where the first item is a movie, the first image may include a scene from the movie, or a picture of an actor in the movie. Where the first item is a game, the first image may include a scene from the game or a picture of a major character in the game. The first set of information indicators may include information concerning cost of the item, rating, players (e.g., for a game), or other relevant information.

Thereafter, the method of the present invention includes the step of waiting for elapsation of one of a first duration without receipt of another input and receipt of another input. In instances where no further inputs were received from the viewer and the first duration was measured and has elapsed, the method of the present invention includes the step of providing additional information to the viewer by displaying serially at least a second image related to the first item. If available, and where another input has not been received from the viewer, a third image related to the first item may also be displayed after the second image related to the first item. The step of displaying the images related to the first item may be repeated at least once so long as no further inputs are received from the viewer during the step of serially displaying the images related to the first item.

However, in instances where the viewer has provided another input regarding one of ordering one of the items denoted in the first menu and selecting another of the menu items in the first menu for purposes of obtaining additional information, the method of the present invention includes the step of breaking out of the loop of displaying serially the plurality of images related to the first item. As such, depending upon the input, the method of the present invention contemplates delivering the ordered item or providing information to the viewer for the second of the selected menu items. For example, where the viewer has selected a second menu item from the first menu, the method of the present invention includes the step of processing such an input to retrieve information (e.g., a second set of information indicators and a first image) concerning the second selected item and displaying such information to the viewer to assist the viewer in making an informed buying decision. In instances where the viewer would like to obtain additional information concerning the second selected item, the step of waiting for one of elapsation of the first duration without receipt of another input and receipt of another input regarding one of ordering the second selected item and selecting a third item in order to obtain information concerning the third item may be repeated to provide the viewer with flexibility in navigating the interactive system.

In another embodiment of the method of the present invention, the method includes the step of playing at least a first recording corresponding to a first item of a first menu. In this regard, the method of the present invention contemplates providing textual, graphic and audio information to the viewer. In one embodiment, where the plurality of serially displayable images relating to the first item corresponds to the first item recording, the step of playing at least the first item recording is conducted substantially simultaneously with the step of displaying serially a plurality of images related to the first item.

In another aspect of the invention, a system for providing information to users or viewers of an interactive system is provided. Generally, the system can be used in connection with an interactive television system (e.g., for electronic games, movies, consumer goods and services), an internet-connected desk top computer system (e.g., for consumer goods and services), and an interactive kiosk (e.g., for event tickets). In one embodiment, the system includes a first means for generating at least a first displayable image of at least a first menu item, the first menu item being displayable in a first menu via a screen associated with the system, a means for processing inputs from the viewer to display information to the viewer via the screen and a means for measuring elapsed time and for serially displaying a plurality of images of at least a first item. For purposes of delivering at least a first item to the viewer, if ordered, the system also includes a means for delivering such ordered items. Such a system includes a computer software program capable of accomplishing the functions described hereinabove with respect to the method of the present invention.

DETAILED DESCRIPTION

FIGS. 1 through 7A–7C illustrate various embodiments of the present invention for a system and method for providing information about items (e.g., products or services) purchasable via interactive systems, according to principles of the present invention. In particular, the system and method of the present invention presents viewers with both static and dynamic information concerning items that can be purchased via the interactive system.

Typical interactive systems, such as interactive television systems (e.g., videotex systems), interactive kiosk systems, and Internet-connected computer systems, are two-way systems which generally include an item list which contains text concerning the items (e.g., products and/or services) being offered for immediate sale to or use by the viewer. In this regard, a viewer of the item list in the interactive system may view the textual item list and purchase substantially contemporaneously, via an input device (e.g., touch screen), an item on the item list. Such item lists are displayable to the viewer via a screen (e.g., television screen, computer screen) to enable the viewer to see the title and/or a brief description of the item(s) being offered. However, in order to display a number of items purchasable by a viewer, the item list, and in particular, the items in the item list are typically described very briefly (e.g., title), if at all. For example, in an item list containing a number of movies which may be ordered for viewing, each of the items (i.e., movies) may be denoted only by the title of the movie and may not contain other useful information, such as the director, cast, or rating of the movie, or whether the movie is suitable for viewing by children. As such, viewers may not be supplied with information needed to make an informed buying decision.

The system and method of the present invention enhance typical interactive systems by providing, for at least a first item, static (e.g., item information indicators, such as cost) and dynamic information (e.g., changing assets, such as serially displayed images, playing audio recording) to the viewer to enable the viewer to make more informed decisions regarding the purchase of categories of or a specific product or service available via an interactive system. Furthermore, both static and dynamic information is provided to the viewer via the screen substantially simultaneously without sacrificing usability or usefulness of the system. As such, viewers of interactive systems of the present invention can readily and easily infer details concerning the item being represented by a text label corresponding to the item.

Figure 1:
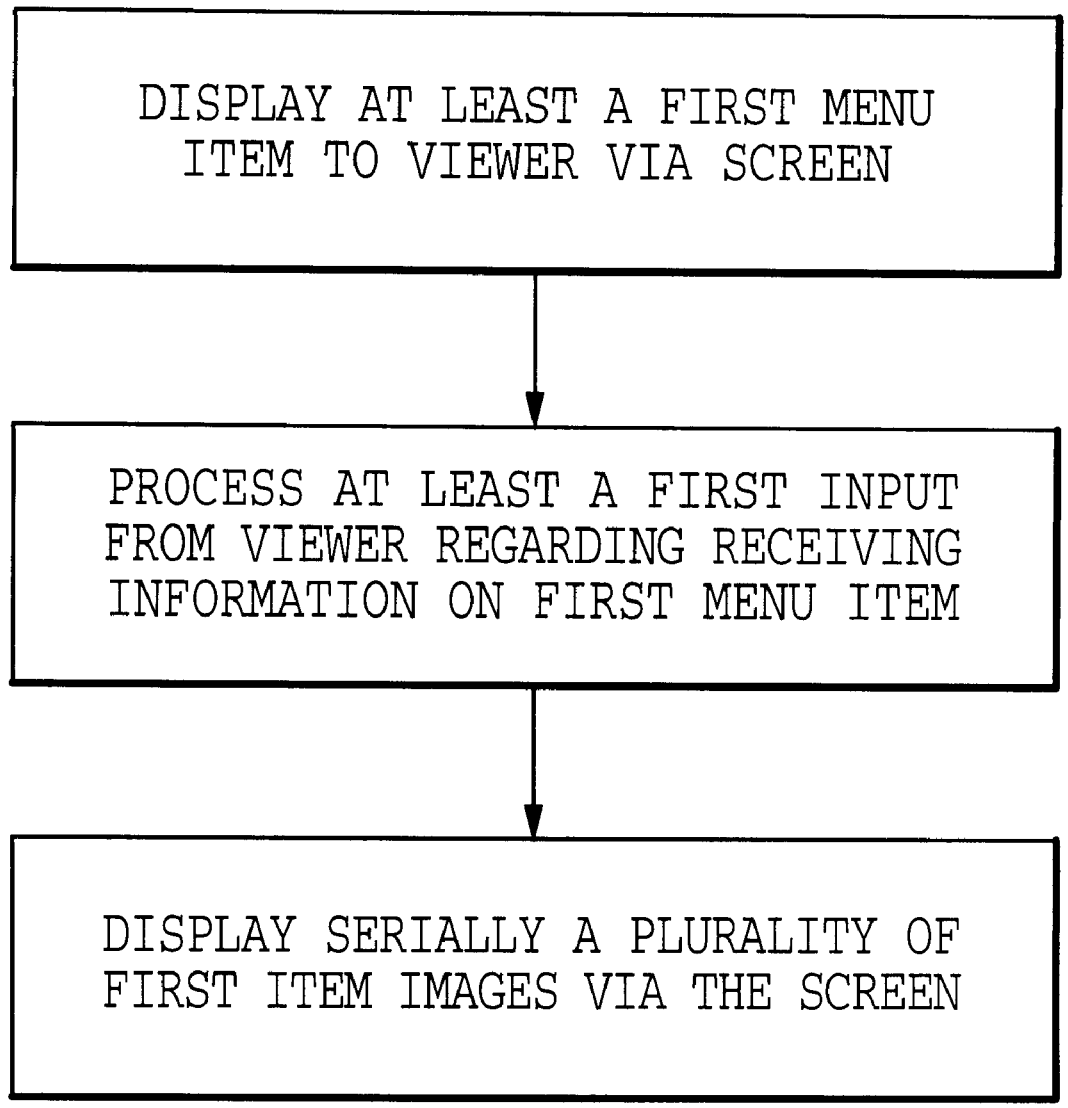
FIG. 1 presents a flow chart of one embodiment of the method of the present invention.
Figure 2A:
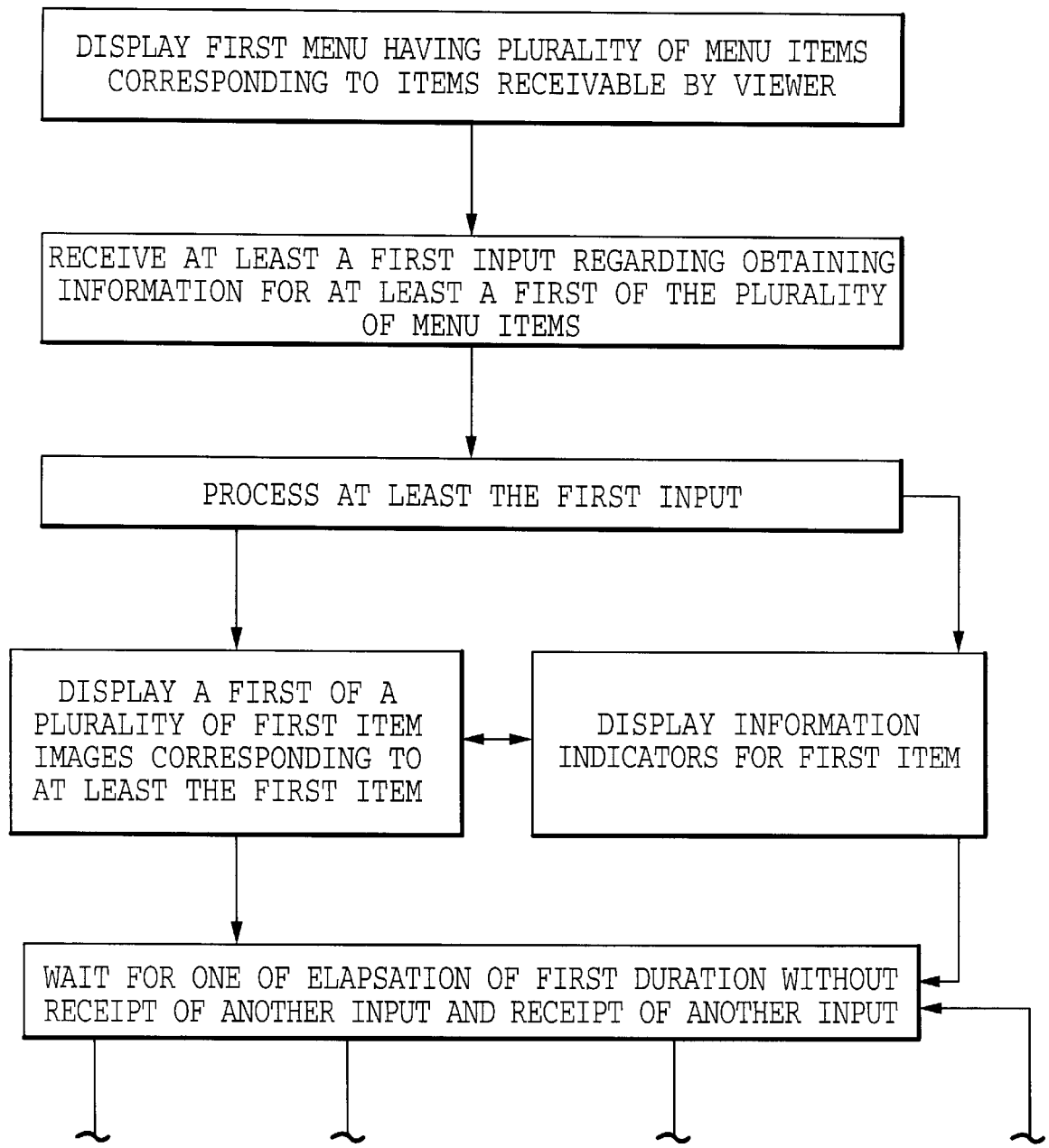
FIGS. 2A–2B present a flow chart of another embodiment of the method of the present invention.
Figure 2B:
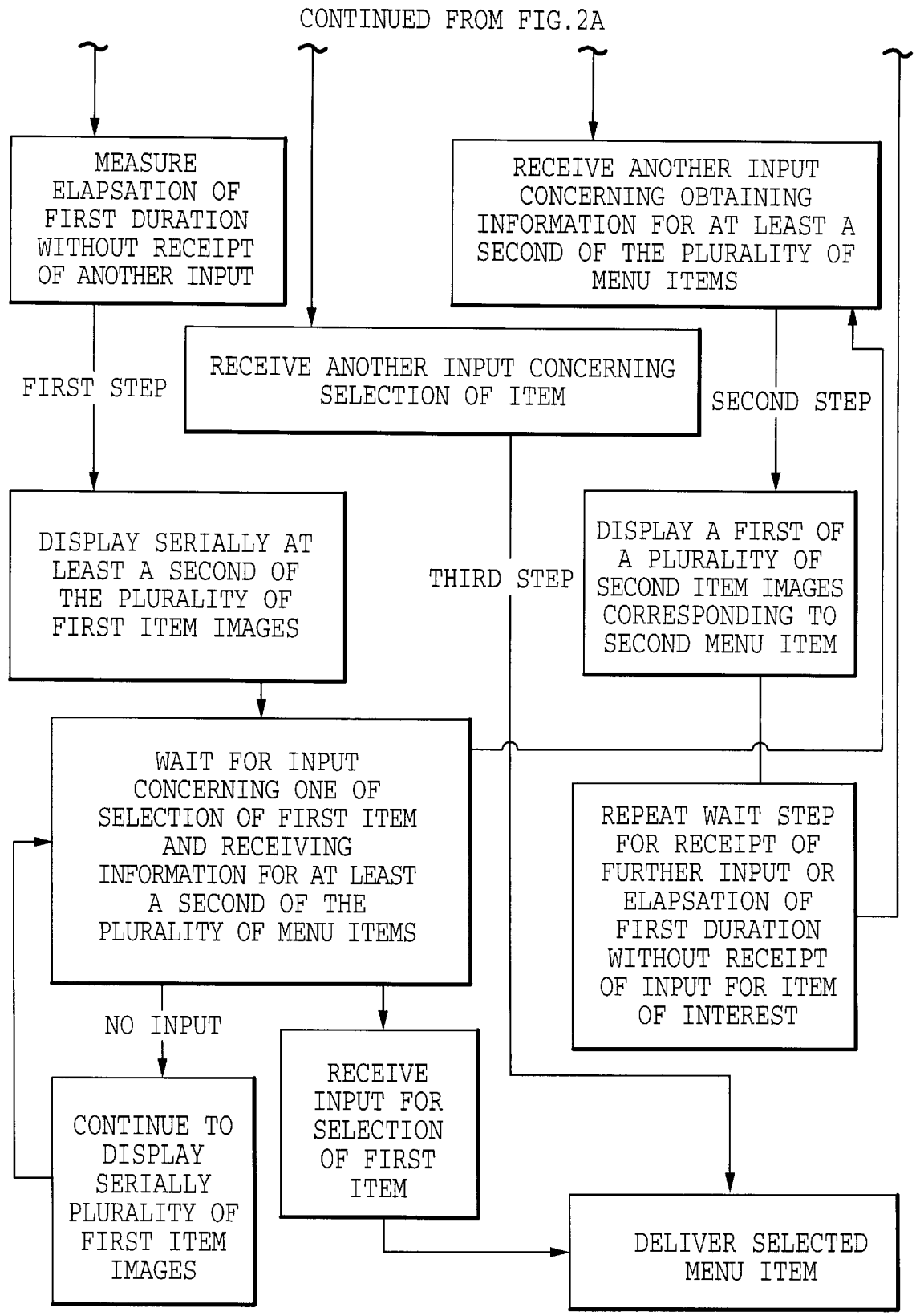
Figure 6A:
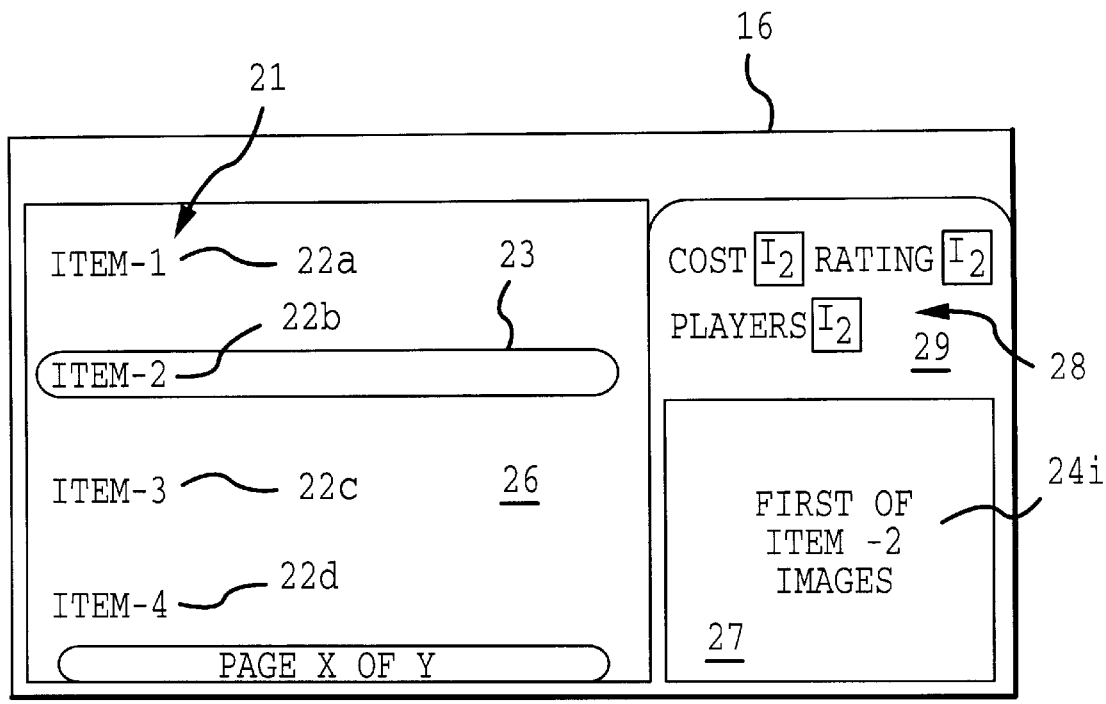
FIGS. 6A–6D illustrate progressive views of displayed textual and graphic information related to a selected item via the screen.
Figure 6B:
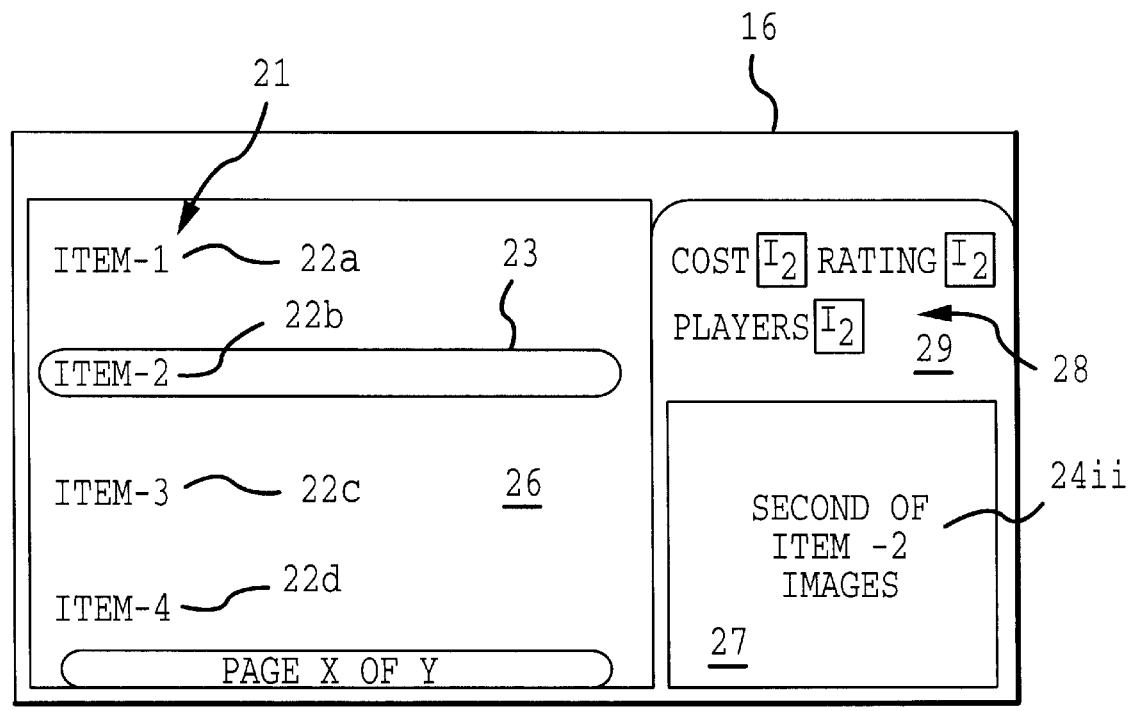

FIGS. 1–3 illustrate various embodiments of the method of the present invention. Substantially as noted hereinabove, the method of the present invention generally concerns a method of interface between an interactive system, such as interactive television, and a viewer, and is especially useful in providing relevant textual and graphic information concerning a particular item (e.g., product or service) represented by a menu item in a menu displayed on a screen or, alternatively, categories of products or services, wherein each category of products or services is represented by a menu item in a menu displayed on a screen. As illustrated in FIG. 1 and 6A–6B, the method of the present invention generally includes the steps of displaying to the viewer via a display screen 16 (e.g., television screen, kiosk screen, video display screen) a plurality of menu items 22a–22d, which correspond to receivable or purchasable items 1–4, to prompt the viewer for at least a first input concerning a particular product or service, processing at least the first input from the viewer regarding obtaining or receiving information concerning at least a first menu item (e.g., menu item 22b), and displaying serially a plurality of images 24i, 24ii corresponding to the first item (e.g., item-2) via the display screen 16 to provide additional information to the viewer. In this regard, in addition to displaying text (e.g., menu item 22b) which corresponds to item-2, the method of the present invention provides for serially displaying at least first and second images 24i, 24ii, which correspond to menu item 22b and item-2 denoted thereby. As such, the method of the present invention assists the viewer in his/her buying decision by serially displaying images concerning the item selected.

Figure 3A:
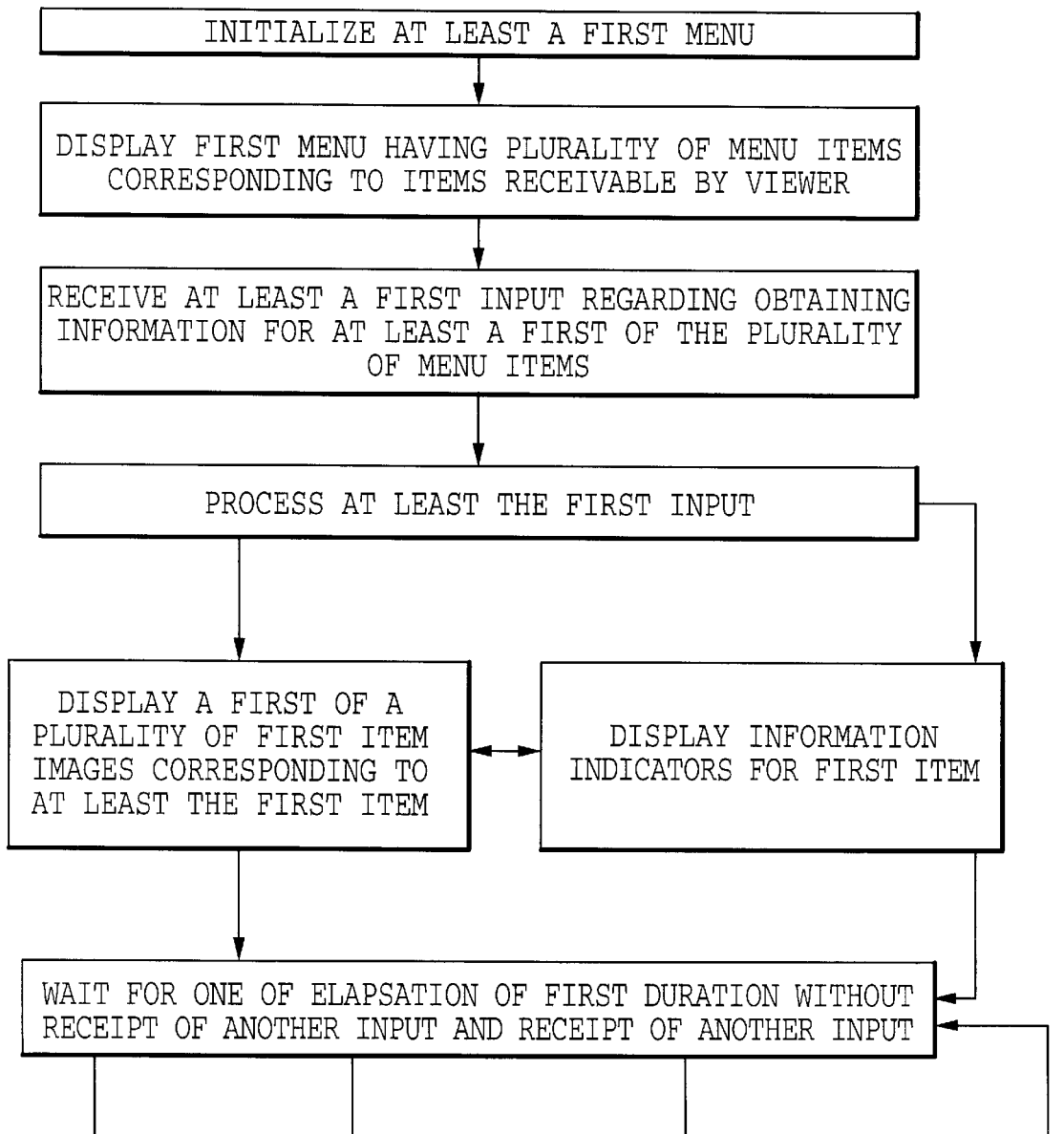
FIGS. 3A–3B present a flow chart of yet another embodiment of the method of the present invention.
Figure 3B:
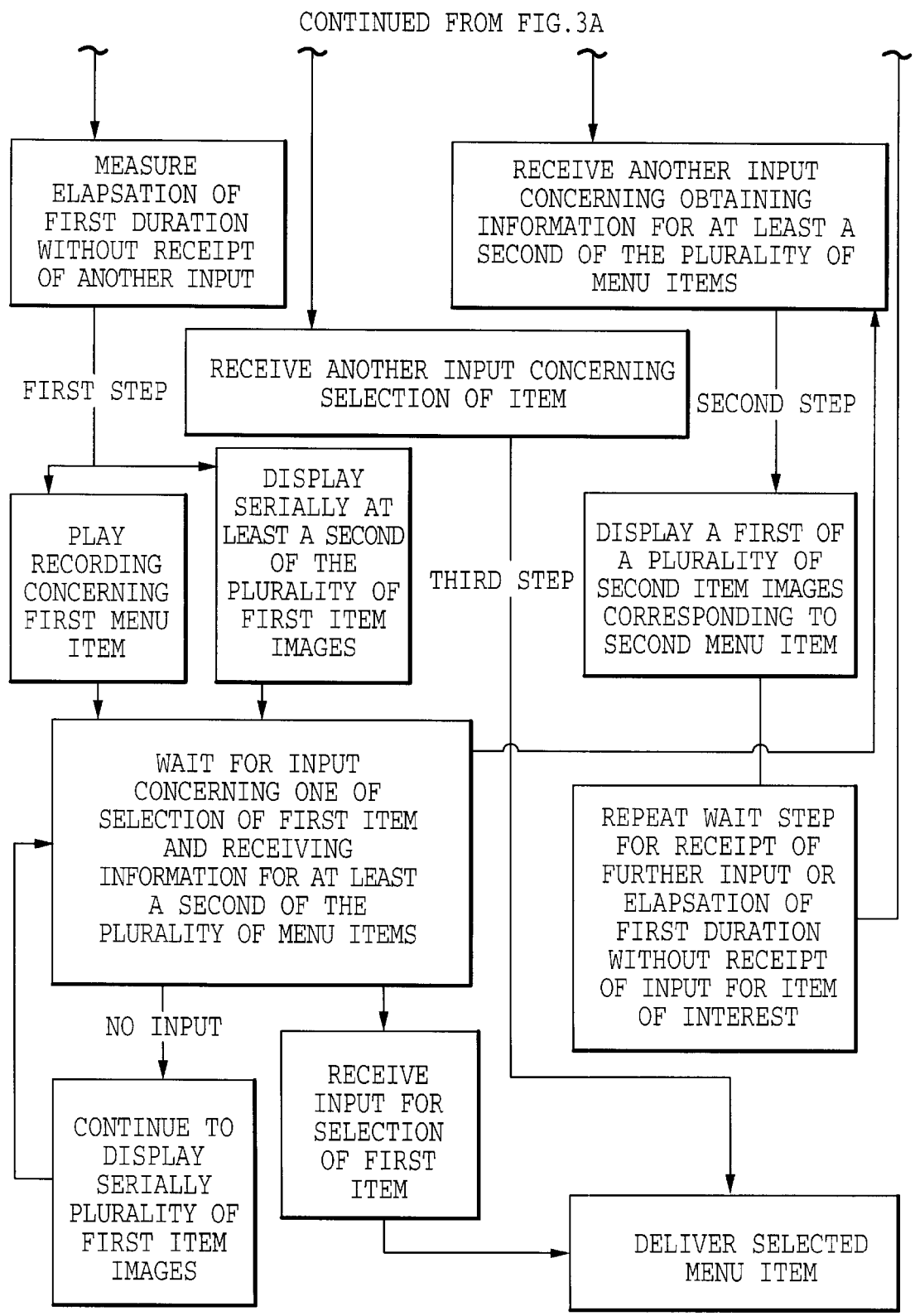

More specifically, for purposes of providing the viewer of an interactive system a plurality of choices of items or categories of items available for purchase, the method of the present invention includes the step of prompting the viewer for at least a first input concerning one of a plurality of items, which can be denoted textually as menu items. In response to such a prompt, the viewer may provide an input corresponding to a desire to obtain further information concerning a particular item by selecting the appropriate menu item or, alternatively, the viewer may provide an input corresponding to purchasing or receiving the item denoted by a particular menu item by choosing the menu item. In one embodiment of the method of the present invention, illustrated in FIG. 2 and FIG. 6A, the step of prompting the viewer includes the step of displaying to the viewer via a display screen 16 at least a first menu 21 having a plurality of menu items (e.g., 22a–22d) corresponding to products or services (e.g., items 1–4) receivable or purchasable by the viewer. The step of displaying at least the first menu 21 may be accomplished by executing a computer software program within a processor (e.g., set top box for interactive television systems). More specifically, for purposes of creating an indexed array corresponding to a displayable first menu, the step of displaying at least the first menu 21 containing a plurality of menu items 22a–22d corresponding to items 1–4 purchasable or receivable by the viewer may include the step of initializing at least the first menu 21 containing the plurality of menu items 22a–22d, as illustrated in FIGS. 3A–3B. Initializing at least the first menu 21 may be accomplished by utilizing a number of methods known by those skilled in the art. In one embodiment, the step of initializing at least the first menu 21 is accomplished by reading data from a database or memory, the data corresponding to the menu 21 containing the menu items 22a–22d, loading the data into an open, ready file, storing the data in the file and indexing arrays corresponding to at least the first menu 21 having a plurality of menu items 22a–22d which correlate to specific products or services (e.g., items 1–4) which are receivable or purchasable by the viewer.

Figure 4:
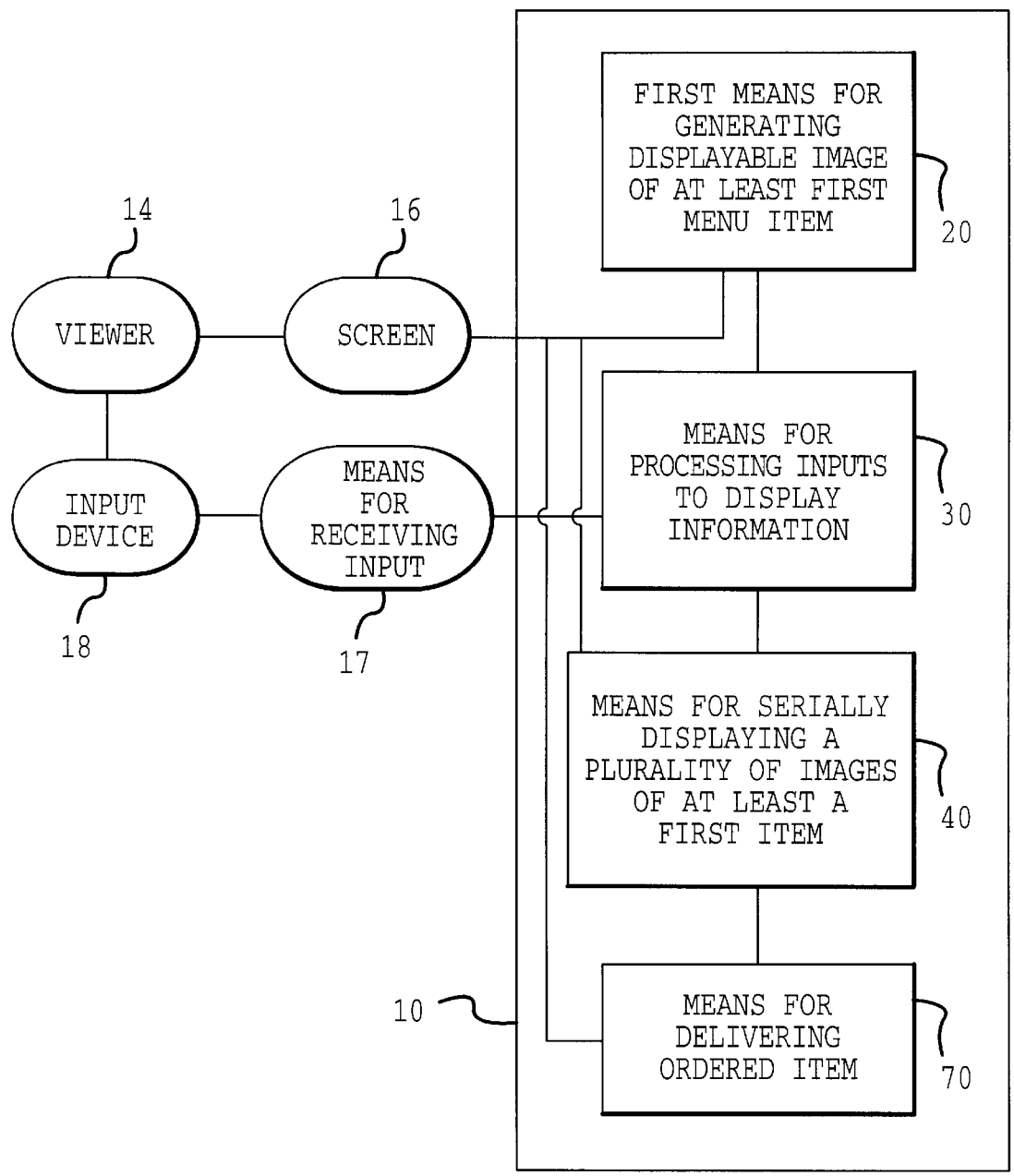
FIG. 4 is a diagrammatic illustration of one embodiment of the system of the present invention.
Figure 5:
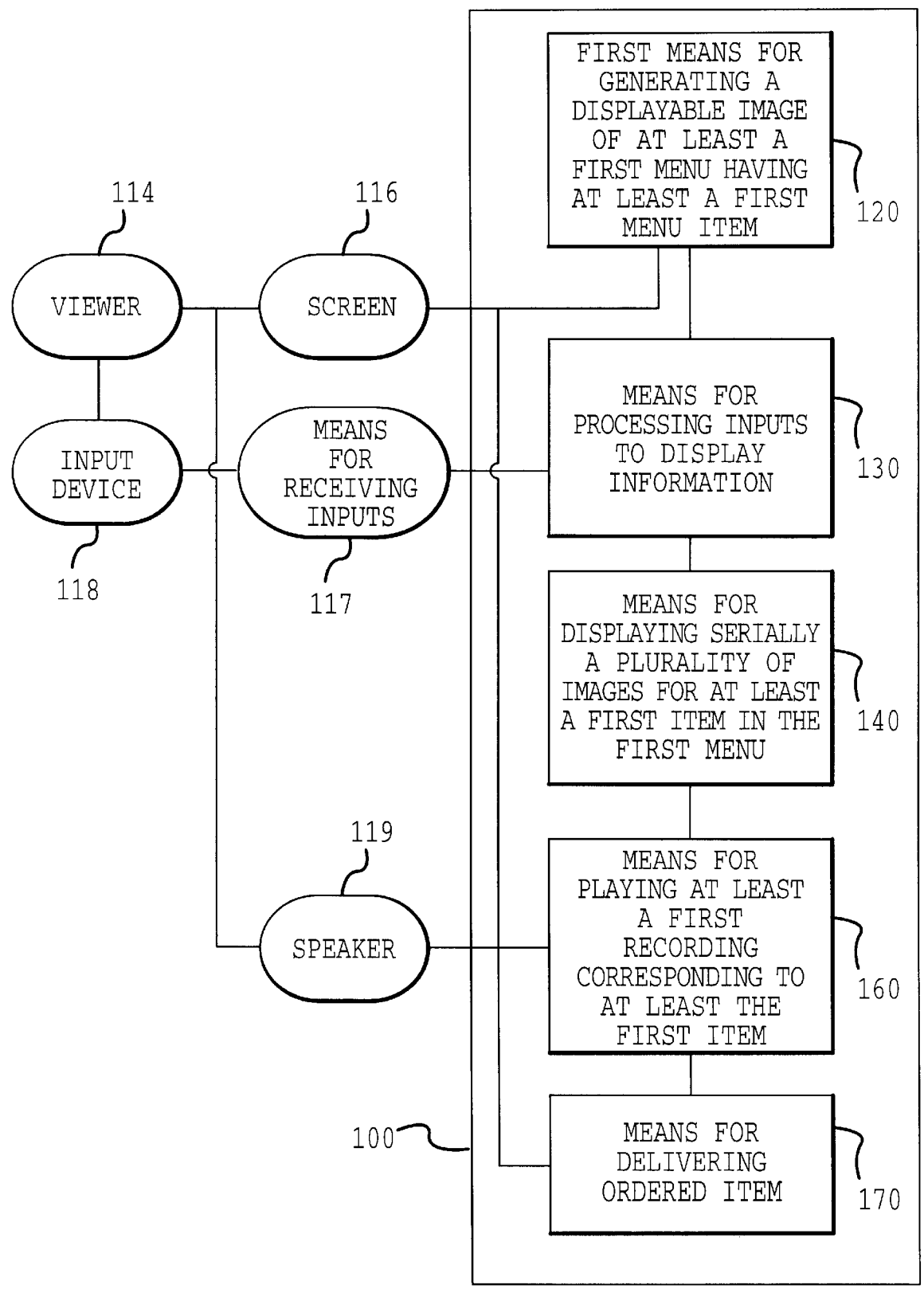
FIG. 5 is a diagrammatic illustration of another embodiment of the system of the present invention.

The step of displaying at least a first menu having a plurality of menu items may be accomplished by utilizing a means 20 for generating a displayable first menu having a plurality of menu items, illustrated in FIG. 4. Such a means 20 for generating a displayable first menu may be implemented in a programmed computer or processor (e.g., the system 10). More specifically, computer software capable of initializing at least the first menu having a plurality of menu items and displaying at least the first menu on the screen may be used to generate the displayable first menu 21, illustrated in FIGS. 6A–6B. Such a computer software program may be implemented in the system 10, which, for an interactive television system, includes a set top box processor. As such, the means 20 may be implemented in a programmed computer (e.g., set top box) with the particular functionality for displaying at least a first menu 21 programmed into the hardware and/or software. Alternatively, the first generating means 20 is implemented in logic circuits in the system 10 (e.g., set top box) that performs the function of at least displaying the first menu. And, in another embodiment, the first generating means 20 is implemented within the system 10 which is encoded with executable instructions representing the above-noted computer program that can cause the system 10 to carry out the function of displaying at least the first menu. In one embodiment, the computer program involves initializing a list (e.g., menu) containing "NumberOfItems" items, initializing "TimeToWait" (e.g., three seconds, which will be described in more detail hereinbelow), displaying the list of items in their initial configuration, setting "index" to some default selection (e.g., first menu item, which corresponds to zero), starting a User Input Thread and starting an Animation Thread (both of which will be described in more detail hereinbelow with reference to means 30, 40 for processing inputs and serially displaying a plurality of images, respectively).

For purposes of collecting inputs from the viewer, the method of the present invention also includes the step of receiving at least a first input from the viewer, as illustrated in FIGS. 2A–2B and 3A–3B. Such a first input may correspond to at least one of selecting at least a first menu item to obtain further information regarding the item to which the first menu item refers, and choosing at least a first item to receive the particular item. In this regard, receiving inputs from the viewer typically relate to the menu item(s) of interest to the viewer. The step of receiving may include the step of receiving at least one of a mouse input, a keyboard input, a touch screen input, a remote controller input and a voice recognizable input. For example, the method of the present invention may be used in connection with an interactive television system, wherein the viewer utilizes a remote controller to scrollably move a displayable selection indicator (e.g., pointer, border, highlighter, etc.) 23 up or down over the first menu, depending upon the menu item of interest, as illustrated in FIGS. 6A–6B. In one embodiment of the method of the present invention, the step of receiving inputs includes receiving scrolling-type inputs from the viewer, whereby the viewer selects the menu item of interest (e.g., menu item 22b) by moving the selection indicator 23 up or down within the menu 21. In one embodiment of the system 10, illustrated in FIG. 4, a receiver 17 (e.g., server) is used to receive inputs from the viewer and forward such inputs to the system 10 for processing by at least one of the means 30 for processing inputs to display information, the means 40 for serially displaying a plurality of images related to at least a first item and the means 60 for delivering a chosen item to the viewer (all of which will be described in more detail hereinbelow). Such a receiver is commercially available from various vendors.

As illustrated in FIGS. 2A–2B and 3A–3B, the method of the present invention also includes the step of processing at least the first input from the viewer, the first input concerning obtaining information relating to at least a first item, to provide displayable information to the viewer concerning the item of interest. In one embodiment, such processing of at least the first input concerns retrieving at least one of textual and/or graphic information concerning at least the first item, as selected by the viewer. For instance, in one embodiment of the method of the present invention, the step of processing at least the first input includes the step of retrieving from a database at least a first image relating to the first item. In this regard, and referring to FIG. 6A, upon receipt of at least the first input corresponding to the first menu item (e.g., menu item 22b), the first input is processed to retrieve at least the displayable first image 24i related to the first item (i.e., item-2). The step of processing at least the first input from the viewer may also include retrieving a set of displayable information indicators concerning the item of interest. Such a set of information indicators generally provides additional textual information for a selected item. For example, and referring to FIG. 6A, upon receipt of at least the first input corresponding to the first menu item (e.g., menu item 22b), the first input is processed to retrieve displayable a set of information indicators 28, which, in this embodiment for a game, include cost, rating and number of players for the game. In instances where the menu lists a plurality of movies, the set of information indicators may include the rating of the movie, actors in the movie and cost for receiving the movie. In other embodiments, the step of processing may include loading from memory or, alternatively, from disk, or, in another embodiment, from a satellite associated with an interactive system, displayable first images of a particular, selected item and/or information indicators.

In addition to processing at least a first input from the viewer, the input concerning obtaining information regarding a particular item and corresponding to a selected menu item in a displayable menu, the method of the present invention also includes displaying such information to the viewer via the screen. The step of displaying such information includes, in one embodiment, displaying via the screen at least one of textual information and graphical information for an item selected by the viewer via a corresponding menu item in the displayable menu. More specifically, the step of displaying information includes, in one embodiment, displaying a set of information indicators and at least a first image for at least a first item, the first item being on the first menu as the first menu item. In this regard, and as illustrated in FIG. 6A, the method of the present invention provides for displaying a first set 28 of information indicators and/or at least a first image 24i concerning a particular product or service (e.g., item-2), which provides further information to the viewer concerning at least the first item 22b (e.g., item-2). Such a first image 24i may take the form of graphical or video images to enhance the information being provided to the viewer. In addition, and as illustrated in FIGS. 6A–6B, where the first menu 21 is displayed on the screen 16 at a first location 26, the step of displaying at least the first image includes the displaying at least the first image (e.g., image 24i) at a second location 27, which is different than the first location 26 of the displayed first menu 21. Similarly, where the first menu 21 is displayed on the screen 16 at a first location 26, the step of displaying the first set of information indicators 28 for at least a first menu item 22b includes the step of displaying at least the first set of information indicators 28 at a third location 29 different than the first location 26 and/or second location 27. As such, textual and graphic information concerning one of the items is displayable simultaneously to the viewer.

In order to process and display such textual (e.g., set of information indicators 28) and graphical (e.g., first image 24i) information directed to a particular item (e.g., item-2) corresponding to the selected menu item (e.g., menu item 22b), the system 10 includes a means 30 for receiving and processing inputs to display information, illustrated in FIG. 4. In this regard, the means 30 for processing inputs to display information is capable of correlating inputs provided by the viewer corresponding to a particular menu item with information (e.g., textual and graphical) concerning each menu item. In one embodiment, the means 30 for processing inputs to display information includes a computer program encoded in a computer memory associated with the system 10. Such a computer program may be referred to as the User Input Thread and generally involves waiting for user input (e.g., up or down), wherein if the user selected "up" and the index is greater than zero, decrement selection index, if the user selected "down" and the index is less than the number of items in the index minus one, increment the selection index, and if the user selected "exit", break from the loop. The computer program further concerns, based upon the user's input, showing the image referred to by the index (e.g., first image relating to selected item), showing other relevant details corresponding to the index (e.g., set of information indicators) and starting a timer set to "time to wait" seconds (which will be described in more detail hereinbelow). In this regard, the means 30 functions to correlate at least the first input provided by the viewer (e.g., selection of a first menu item) with the first set of information indicators and a first image associated with the first item denoted by the selected first menu item. In alternative embodiments, such a software program for processing and displaying information may be implemented in the system 10, or, in a logic circuit.

As noted hereinabove, upon receipt of at least a first input concerning obtaining information for at least a first item, the method of the present invention contemplates processing such input and displaying to the viewer at least a first image corresponding to the first item. The viewer may thereafter receive (e.g., order) an item by choosing the menu item corresponding to the desired item (e.g., the first item) or, alternatively, select another (e.g., a second) menu item to obtain information concerning another (e.g., second) item, or, alternatively, wait to view serially displayable images corresponding to the first item, which provides the viewer with additional information concerning the first item. In this regard, in one embodiment, illustrated in FIGS. 2A–2B and 3A–3B, the method of the present invention includes the step of waiting for one of elapsation of a first duration (e.g., 2 or 3 seconds) and receipt of another input.

In instances where the viewer would like to receive or purchase an item (e.g., the first item or any other of the items listed on the menu), the viewer may, prior to the elapsation of the first duration, provide another input to the system 10. In this regard, and as illustrated in FIGS. 2A–2B and 3A–3B, in instances where the viewer has provided another input, the method includes the step of receiving another (e.g., second) input from the viewer, wherein the input concerns purchasing or ordering one of the items listed in the menu. After receipt of such an input, the method of the present invention includes the step of delivering the item chosen to the viewer. Such a chosen item (e.g., electronic game, movie, computer program etc.) may be delivered to the viewer 14 via a means 70 for delivering a chosen item, illustrated in FIG. 4, which is a conventional system known by those skilled in the art (e.g., for interactive television systems).

Figure 7A:
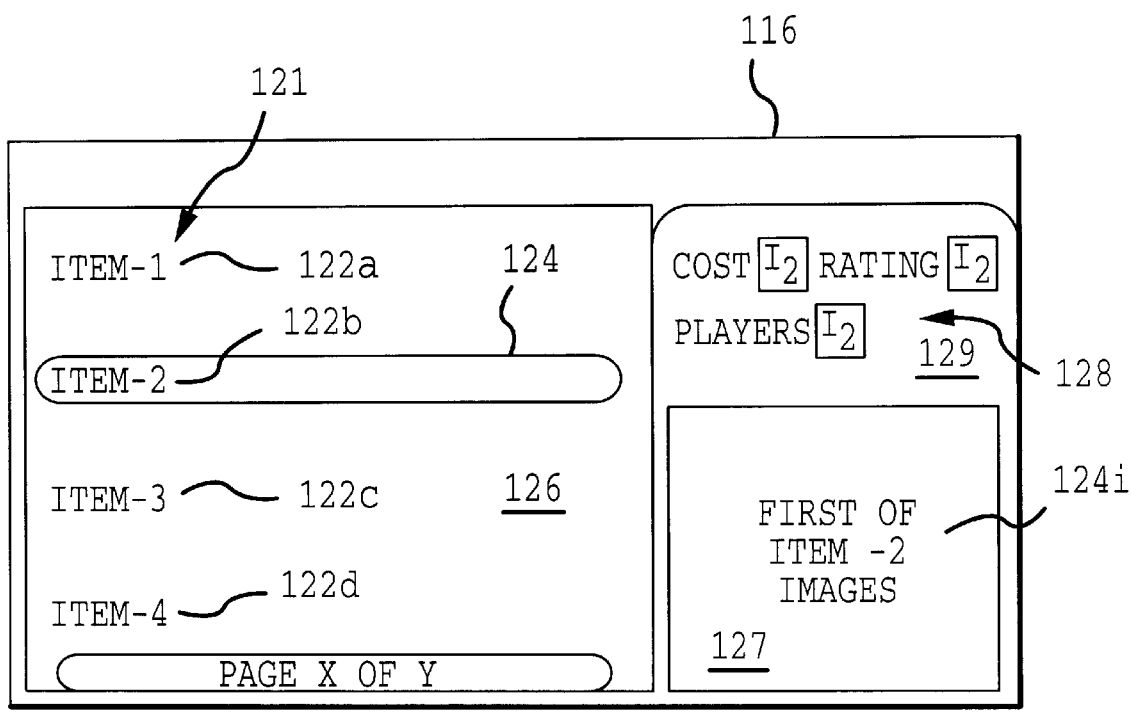
FIGS. 7A–7C illustrate progressive views of displayed textual and graphic information related to a first selected item and then a second selected item.
Figure 7B:
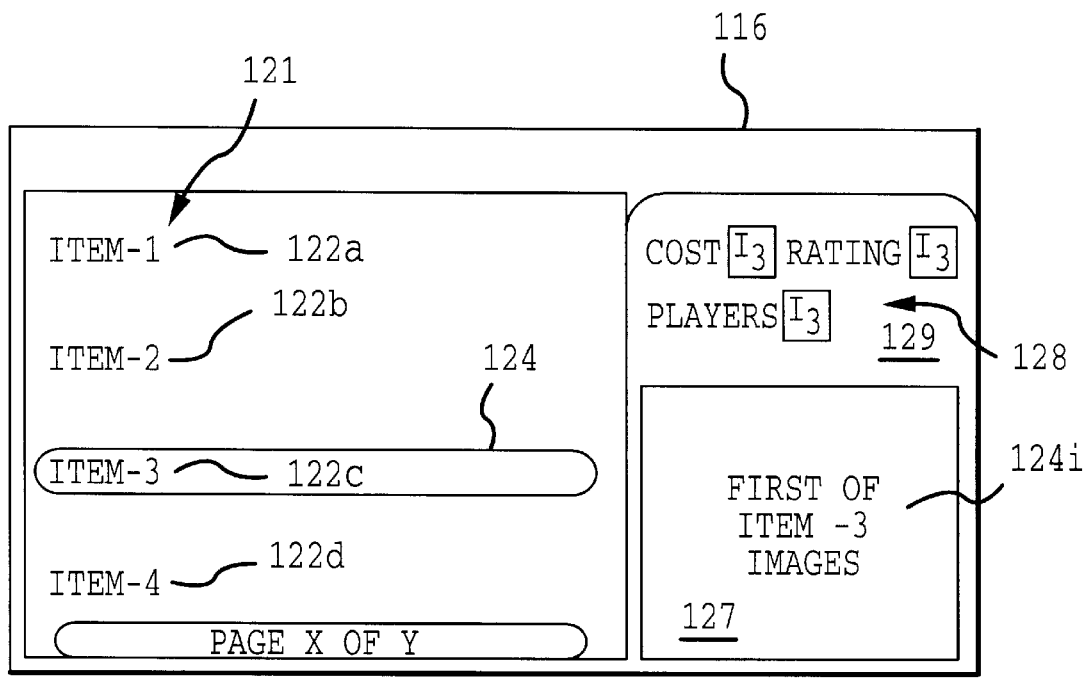

In other instances, a viewer may wish to obtain information concerning another (e.g., a second) item. In this regard, the method of the present invention includes the steps of receiving such an input prior to elapsation of the first duration and processing the input to retrieve and display at least one of a second set of information indicators and a first image corresponding to the second selected menu item, both of which correspond to a second item. The steps of processing the input to retrieve and display the second set of information indicators and/or the first image related to the second item may be performed substantially as described hereinabove with regard to processing the first input to retrieve and display the first set of information indicators for the first item and the first image relating to the first item. For example, where the viewer wishes to obtain information concerning a second item (e.g., item-3), the viewer may select another menu item (e.g., 122c) on the menu item list 121 by moving the selector indicator 124 from a first menu item (e.g., 122b) to the second menu item (e.g., 122c), as illustrated in FIGS. 7A–7B. In this regard, the step of receiving such an input includes receiving one of an "up" or "down" input to select another menu item to obtain information concerning another item. Upon receipt of the second input, in one embodiment, the step of processing at least the second input includes the step of retrieving from a database at least one of a second set of information indicators 128 for the second item (e.g., item-3) and at least a first 124*i* displayable image corresponding to the second item (e.g., item-3). In other embodiments, the step of processing at least the second input includes the step of loading at least one of a second set of information indicators and a first image relating to the second item from a memory, or alternatively, a disk, or in yet another alternative embodiment, from a satellite associated with the interactive system. In this regard, and as illustrated in FIG. 7B, upon receipt of a selection input of the second menu item (e.g., menu item 122*c*) for obtaining information concerning the second item (e.g., item-3), such input is processed to retrieve at least the first 124*i* displayable image for the second item (e.g., item-3). The steps of processing such inputs to retrieve and display such information concerning the second item may also be performed by the means 30 for processing inputs to display information, illustrated in FIG. 4 and substantially as described hereinabove.

In instances where the viewer would like more information concerning the first item (e.g., item-2), the viewer may simply pause momentarily. In this regard, and as illustrated in FIGS. 2A–2B and 3A–3B, the method of the present invention includes the step of measuring at least the first duration of time without receipt of another input, the first duration being measured from about the time when the viewer has selected a first menu item to obtain information regarding a first item and/or at least the first of a plurality of images related to the first item has been displayed to the viewer until the first duration has elapsed. As such, where the first duration (e.g., 1 second, 2 seconds, 3 seconds or less than 5 seconds) has elapsed without receipt of any additional inputs from the viewer, the method of the present invention further includes the step of displaying serially at least a second of the plurality of images corresponding to the selected menu item. For example, and as illustrated in FIGS. 6A–6B, in instances where a viewer has selected a first menu item 22*b* from the displayable menu 21 in order to examine information (e.g. first set 28 of information indicators and a first image 24*i* related to the selected item (i.e., item-2) presented to the viewer via the screen 16, the viewer may wish to obtain additional graphic information concerning the selected item (i.e., item-2). In accordance with the method of the present invention, the viewer may thereafter pause for the first duration to view at least a second image 24*ii* related to the selected item, the second image 24*ii* being displayable for at least 0.033 second, and, in another embodiment, for between about 0.033 seconds and about 0.067 seconds. Thereafter, the viewer may elect to have the selected item (i.e., item-2) delivered to the viewer, substantially as described hereinabove or, alternatively, the viewer may obtain additional information (e.g., graphic) concerning the selected first item (e.g., item-2) by providing no inputs or, alternatively, the viewer may elect to obtain information (e.g., graphic) concerning a second item (i.e., item-2) by selecting a second menu item 22*c* corresponding to a second item (e.g., item-3), as illustrated in FIGS. 2A–2B, 3A–3B and 7A–7B. In this regard, the method of the present invention contemplates continuing to display serially images (e.g., a third image 24*iii* or the first image 24*i*) concerning the selected item (e.g., item-2) to the viewer until another input is received (e.g., regarding ordering a specific item and/or selecting another menu item (e.g., menu item 22*c*, corresponding to a second item (e.g., item-3), which will be described in more detail hereinbelow). Such a third image 24*ii* may be displayed after the second image 24*ii*, for at least about 0.033 seconds.

Figure 6C:
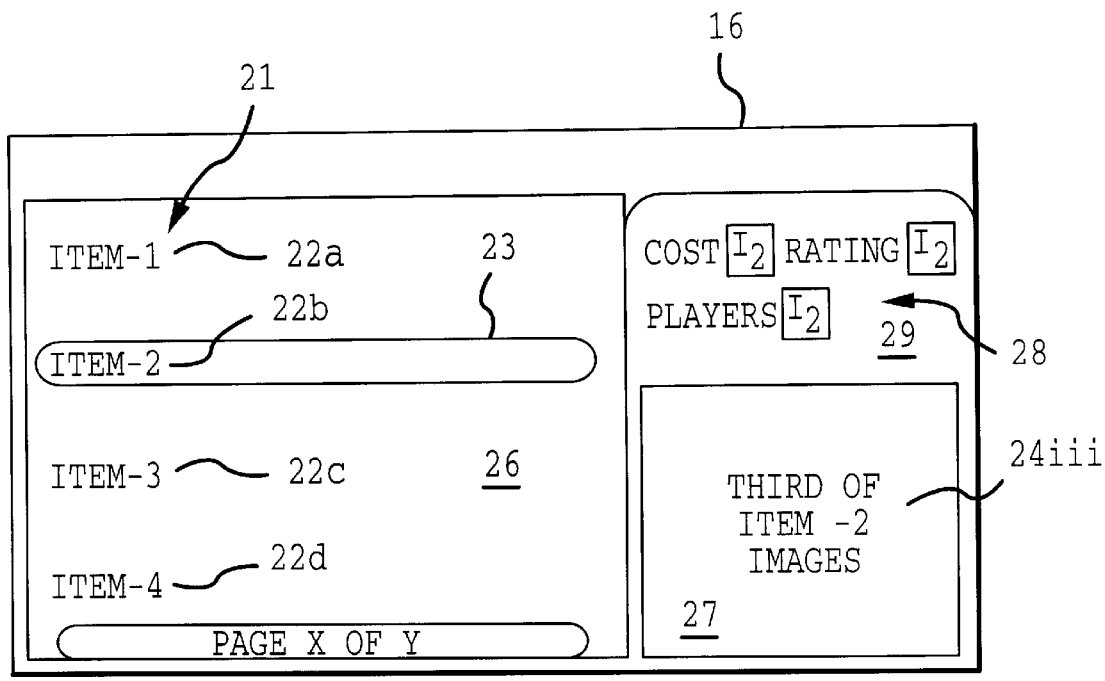
Figure 6D:
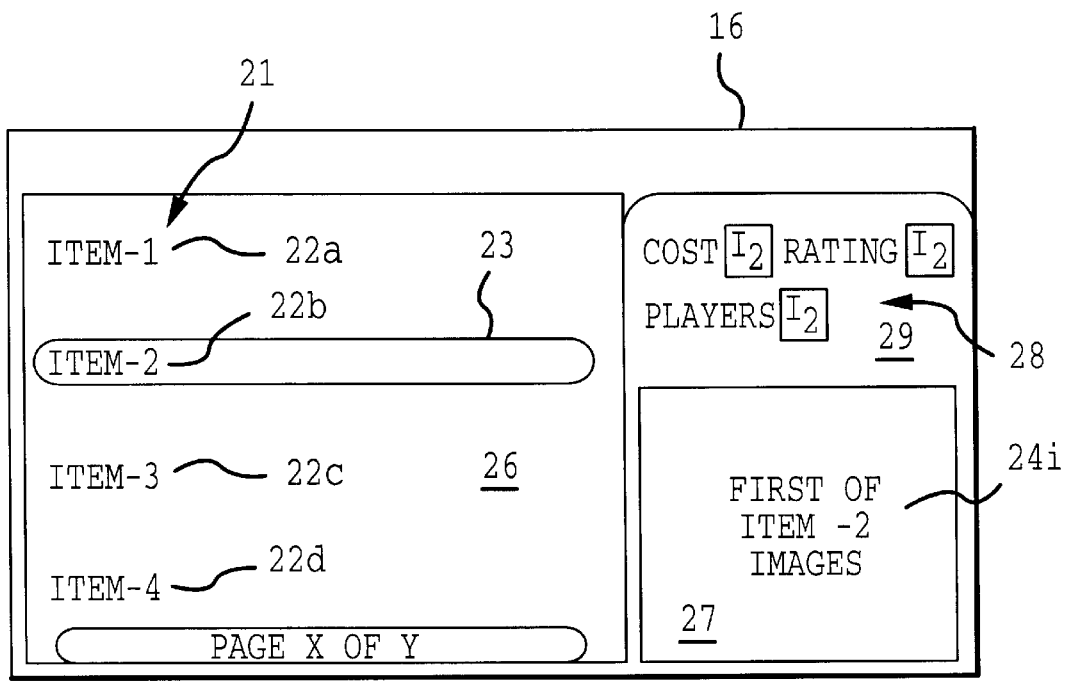

For example, and as illustrated in FIGS. 6C–6D, in one embodiment, where no further inputs are received and a third image 24*iii* relating to the selected item (e.g., item-2) is available for display, the step of continuing to serially display images relating to the selected item comprises the step of displaying, serially (i.e., after the second image 24*ii*), the third image 24*iii*. In instances where a fourth image (not shown) is available for display to the viewer to provide additional information concerning the selected item (e.g., item-2), the step of continuing to serially display images includes displaying at least the fourth image. Otherwise, the step of continuing to serially display images concerning the selected item includes looping back to the first image 24*i*, as illustrated in FIGS. 6C–6D, to serially display the first, second and third images 24*i*–24*iii* in a repeating fashion, until another input is received from the viewer.

In instances where the viewer provides another input regarding selecting another menu item to obtain information regarding the product or service to which the menu item refers, the method of the present invention includes the step of receiving another input for the selection of a second menu item (e.g., menu item 22*c*) in order to obtain information concerning a second item (e.g., item-3), substantially as illustrated in FIGS. 2A–2B and 3A–3B. Upon receipt of such an input, the method of the present invention contemplates displaying information (e.g., textual and graphic) related to the second item, as illustrated in FIGS. 7A–7B. In this regard, and substantially as described hereinabove, the step of displaying information includes retrieving from a database and displaying on the screen 116 at least one of a second set of information indicators 128 (e.g., cost, rating and number of persons capable of playing item-3, an electronic game) concerning the selected item 122*c* (e.g., item-3) and at least a first image 124*i* (e.g., scene from game) related to the selected item (e.g., item-3). As such, textual and graphic information may be provided to the viewer.

Figure 7C:
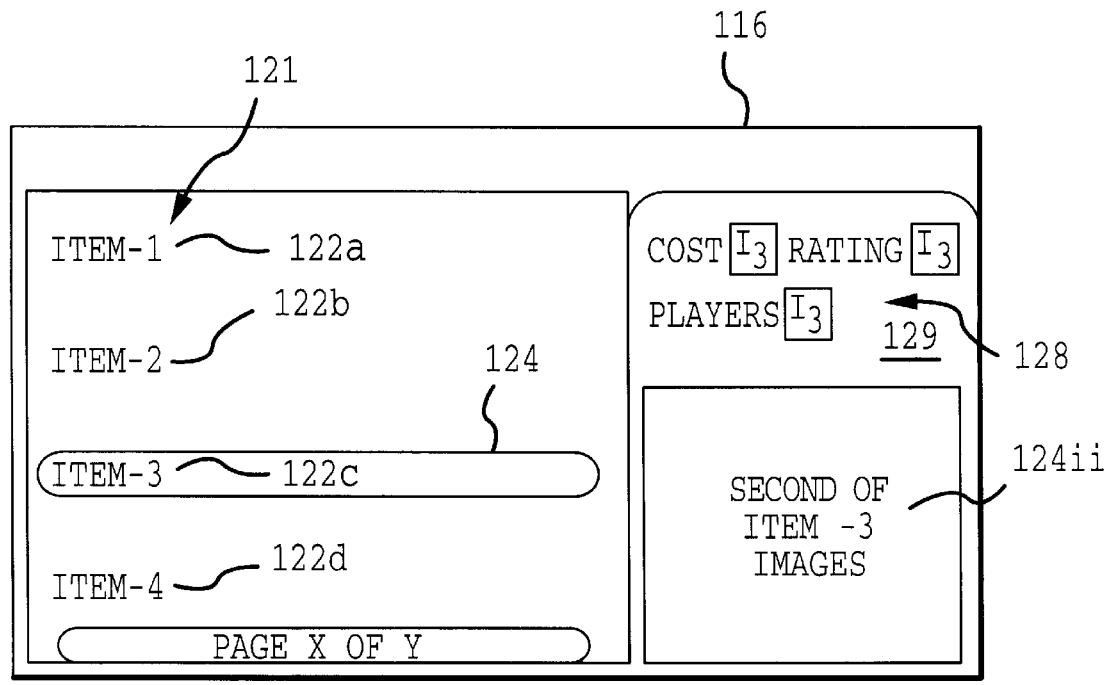

The method of the present invention also concerns providing further graphic information to the viewer, if desired, in instances where the viewer would like more information concerning the second selected item (e.g., item-3). Substantially as described hereinabove, the step of waiting for one of elapsation of the first duration without receipt of another input and receipt of another input concerning one of ordering an item and obtaining additional information (e.g., image 124*ii*) related to the second selected item (e.g., item-3) may be repeated. In this regard, and as illustrated in FIGS. 7A–7C, the method of the present invention again provides the viewer with the opportunity to order an item, to select another menu item in order to obtain information concerning the item of interest, or to obtain additional information (e.g., serially displayable images) related to the second selected item 122*c*. For example, where no further inputs were received and the first duration has elapsed, the method includes the step of displaying at least a second image 124*ii* related to the second selected item 122*c* (e.g., item-3).

As illustrated in FIG. 4, a means 40 is generally utilized measure elapsed time for the first duration and, depending upon whether any inputs are received, to serially display images a plurality of images (e.g., images 24*ii* and 24*iii*, illustrated in FIGS. 6A–6B) related to the selected item (e.g., item-2). In one embodiment, the means 40 for serially displaying images relating to a selected item includes a computer software program. In one embodiment, the computer software program has two loops, wherein the first loop involves determining if the timer set to "TimeToWait" seconds (e.g., first duration) has elapsed. If such timer has elapsed, the second loop is run, which involves showing the next image (e.g., animation cell). If the index (e.g., selection of menu item by viewer) has changed, the second loop is exited and the "User Input Thread" described hereinabove is run. If there are no more animation cells to show, the program breaks from this second loop and the first loop is run again. Such a computer software program is generally denoted as the "Animation Thread" and may be implemented in the system 10, which, for an interactive television system, comprises a set top box processor. As such, the means 40 may be implemented in a programmed computer (e.g., set top box) with the particular functionality for displaying serially a plurality of item images programmed into the hardware and/or software. Alternatively, the means 40 for displaying serially a plurality of item images is implemented in logic circuits in the system 10 (e.g., set top box). And, in another embodiment, the means 40 is implemented within the system 10 which is encoded with executable instructions representing the above-noted computer program that can cause the system 10 to carry out the function of serially displaying a plurality of item images.

In another embodiment, for purposes of providing additional information to the viewer, the method of the present invention also includes the step of playing at least a first recording corresponding to at least a first selected item, the first item being denoted in a first menu by a first menu item. More specifically, and as illustrated in FIGS. 3A–3B, the step of playing at least a first recording corresponding to the first item includes playing the first recording substantially simultaneously with the step of displaying serially at least a second image relating to the first item. In this regard, substantially after or upon elapsation of the first duration without receipt of another input, the first recording may be played as the plurality of images relating to the first selected item are displayed serially. A means 160 for playing may be utilized to play such recordings over a speaker 119 associated with the screen 116 and system 100. The means 160 for playing are preferably digital (e.g., QUICKTIME™ players, which are commercially available from Apple Computer, Inc., and MPEG players, which are commercially available from various vendors).

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described herein and above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A method for providing information, via at least a screen, to a viewer of at least first and second menu items in an interactive system, the first menu item corresponding to a first item deliverable to the viewer and the second menu item corresponding to a second item deliverable to the viewer, comprising the steps of:

displaying at least the first menu item to the viewer via the screen, wherein the first menu item is selectable by the viewer to receive the first item;

displaying at least the second menu item to the viewer via the screen during at least a portion of said displaying at least the first menu item step, wherein the second menu item is selectable by the viewer to receive the second item;

processing at least a first input from the viewer, the first input corresponding to the viewer selecting one of the first and second menu items to obtain information concerning one of the first and second items, respectively; and displaying serially to the viewer via the screen a plurality of item images corresponding to the first item when the first input corresponds to the viewer selecting the first menu item and corresponding to the second item when the first input corresponds to the viewer selecting the second menu item, wherein a second of the plurality of item images is displayed after a first of the plurality of item images.

2. A method, as claimed in claim 1, wherein said processing step comprises the steps of:

receiving at least the first input from the viewer; and waiting for one of receiving a second input from the viewer and elapsation of a first duration without receipt of the second input, wherein the second input corresponds to one of ordering an item and selecting another item, wherein the first duration is measured from receipt of at least the first input.

3. A method, as claimed in claim 2, wherein said step of displaying serially the plurality of item images is performed at least the first duration after at least the first input is received from the viewer.

4. A method, as claimed in claim 2, wherein said step of displaying serially the plurality of item images is performed upon elapsation of the first duration.

5. A method, as claimed in claim 2, wherein the first duration is less than about 3 seconds.

6. A method, as claimed in claim 1, wherein said step of displaying serially the plurality of item images comprises the steps of:

displaying at least the first of the plurality of item images for at least about 1 second; and displaying at least the second of the plurality of item images for at least about 0.033 second.

7. A method, as claimed in claim 1, wherein said step of displaying serially the plurality of item images comprises the steps of:

displaying at least the first of the plurality of item images for between about 1 second and about 3 seconds; and displaying at least the second of the plurality of item images for between about 0.033 second and about 0.067 second.

8. A method, as claimed in claim 1, further comprising, after said step of processing at least the first input, the step of:

performing at least one of first and second steps, wherein the first step includes displaying, via the screen, information indicators concerning at least the first item when the first input corresponds to the viewer selecting the first menu item and concerning at least the second item when the first input corresponds to the viewer selecting the second menu item, wherein the second step includes playing, via at least one speaker associated with the screen, a recording corresponding to the first item when the first input corresponds to the viewer selecting the first menu item and corresponding to the second item when the first input corresponds to the viewer selecting the second menu item.

9. A method for providing information, via at least a screen, to a viewer of at least a first menu having a plurality of menu items corresponding to a plurality of items deliverable to the viewer, comprising the steps of:

displaying the first menu;

processing at least a first input from the viewer, the first input corresponding to a first menu item to obtain information concerning a first item;

displaying at least a first of a plurality of first item images corresponding to the first item;

waiting for one of receipt of a second input from the viewer within a first duration and elapsation of the first duration without receipt of the second input, the second input corresponding to one of the viewer selecting a second item to obtain information concerning the second item and ordering one of the items in the first menu for delivery to the viewer; and performing one of first and second steps, wherein said first step is performed after elapsation of the first duration without receipt of the second input, said first step including displaying at least a second of the plurality of first item images, wherein said second step is performed after receipt of the second input within the first duration, said second step including one of displaying at least a first of a plurality of second item images corresponding to a second menu item and delivering the one of the items to the viewer.

10. A method, as claimed in claim 9, wherein the first menu is displayed at a first location on the screen and the first of the plurality of first item images is displayed at a second location on the screen, wherein the first location is displaced from the second location.

11. A method, as claimed in claim 10, wherein the second of the plurality of first item images is displayed at the second location on the screen, after the first of the plurality of first item images.

12. A method, as claimed in claim 9, further comprising the step of:

initializing the first menu to generate an indexed menu array having at least the first and second menu items.

13. A method, as claimed in claim 9, further comprising, after said step of displaying at least the first menu item, the step of:

waiting for at least the first input from the viewer.

14. A method, as claimed in claim 9, wherein said waiting step comprises the step of measuring elapsed time, wherein said measuring elapsed time step starts at least after said step of displaying at least the first of the plurality of first item images and ends upon one of elapsation of the first duration without receipt of the second input and receipt of the second input prior to elapsation of the first duration.

15. A method, as claimed in claim 9, further comprising, after said step of processing at least the first input, the step of:

displaying, via the screen, at least a first information image concerning at least the first item, wherein the first information image is displayed at a third location on the screen, displaced from the first and second locations.

16. A method, as claimed in claim 9, wherein said performing step comprises performing said first step, said method further comprising the steps of:

displaying serially, after at least the second of the plurality of first item images, at least one of a third of the plurality of first item images and the first of the plurality of first item images; and waiting for receipt of the second input from the viewer.

17. A method, as claimed in claim 9, wherein said performing step comprises performing said second step and the second input corresponds to the second menu item to obtain information concerning the second item, said method further comprising the step of:

receiving the second input from the viewer;

displaying, via the screen, at least the first of the plurality of second item images; and waiting for one of receipt of a third input from the viewer within the first duration and elapsation of the first duration without receipt of the third input, the third input corresponding the viewer selecting one of the plurality of menu items to obtain information for the one of the plurality of menu items in the first menu and the viewer ordering one of the items in the first menu.

18. A method, as claimed in claim 9, wherein said performing step comprises performing said first step, said method further comprising the step of:

playing, via at least a first speaker associated with the screen, at least a first recording corresponding to the first item.

19. A method, as claimed in claim 9, wherein the screen providing information is associated with at least one of an interactive television system, an Internet-connected desk top computer and an interactive kiosk system.

20. A system for providing information, via at least a screen, to a viewer of at least first and second menu items, the first menu item corresponding to a first item deliverable to the viewer and the second menu item corresponding to a second item deliverable to the viewer, comprising:

first means for generating a displayable image of the first and second menu items to the viewer via the screen wherein the second menu item is displayable to the viewer with the first menu item;

means, associated with said first means for generating, for processing at least a first input from the viewer, the first input concerning one of the first and second menu items corresponding to one of the first and second items, respectively, selectable by the viewer; and means, associated with said means for receiving, for serially displaying, in response to at least the first input, a plurality of images corresponding to said one of the first and second items, said means for serially displaying the plurality of images being capable of serially displaying at least a second of the plurality of images corresponding to said one of the first and second items after a first of the plurality of images corresponding to said one of the first and second items.

21. A system, as claimed in claim 20, further comprising:

means, associated with said means for processing and said means for serially displaying the plurality of images, for measuring elapsed time from receipt of at least the first input from the viewer to one of elapsation of a first duration without receipt of at least a second input from the viewer and receipt of at least the second input from the viewer, wherein the second input concerns one of the viewer selecting the other of the first and second menu items displayable to the viewer to obtain information concerning said other of the first and second menu items and the viewer ordering said one of the first and second items.

22. A system, as claimed in claim 21, wherein the first duration is at least about 1 second.

23. A system, as claimed in claim 21, wherein the first duration is at less than about 5 seconds.

24. A system, as claimed in claim 20, further comprising:

means, associated with the means for serially displaying the plurality of images, for playing at least a first recording corresponding to at least one of said one of the first and second menu items and first of the plurality of images corresponding to said one of the first and second items.

25. A system, as claimed in claim 20, wherein the screen is in electrical communication with at least one of an interactive television system, an Internet-connected desk top computer and an interactive kiosk system.

\* \* \* \* \*